Figure 1:
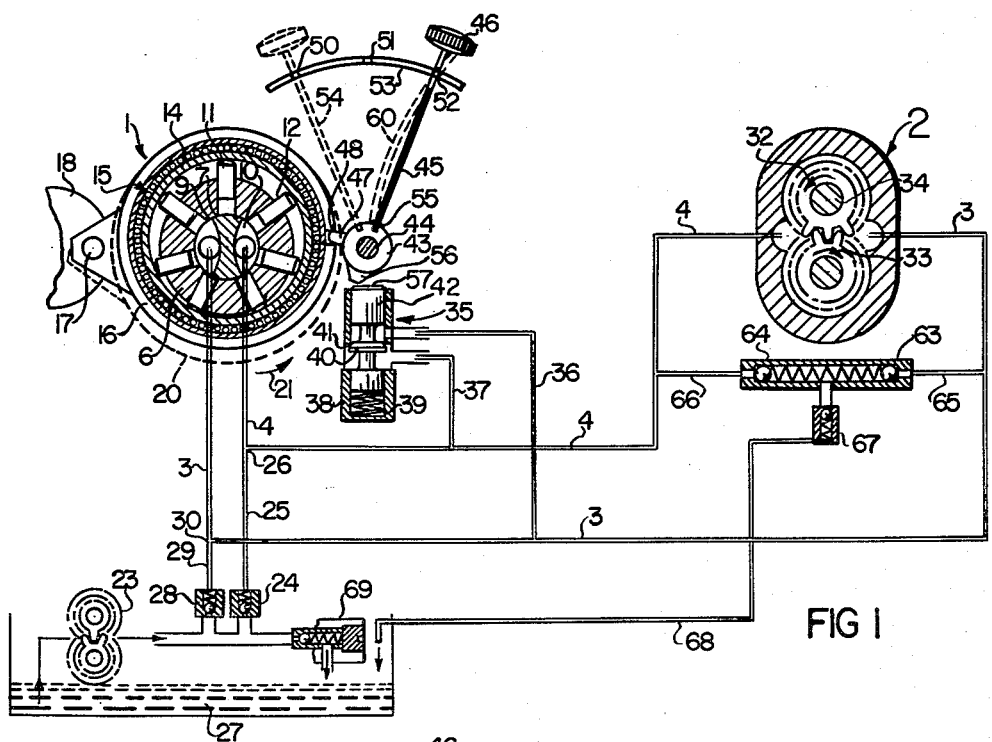

March 2, 1965   J. A. LAUCK   3,171,255

HYDROSTATIC TRANSMISSION

Filed April 17, 1962

*INVENTOR.*
JOHN A. LAUCK

BY Oberlin, Maky & Donnelly

ATTORNEYS

United States Patent Office 3,171,255
Patented Mar. 2, 1965

3,171,255
HYDROSTATIC TRANSMISSION
John A. Lauck, 31635 Aurora Road, Solon, Ohio
Filed Apr. 17, 1962, Ser. No. 188,026
11 Claims. (Cl. 60—53)

This invention relates generally, as indicated, to a hydrostatic transmission and more particularly to a control mechanism for such hydrostatic transmission.

It is, of course, the object of any automatic transmission that when driven by some engine or prime mover at some fixed speed, that the output torque be able to vary beyond the capabilities of the maximum engine torque output. By this it is meant that a 5 H.P. motor which develops, for example, 131 inch/pounds torque at 2400 r.p.m. may be called upon to develop 200 or 300 inch/pounds torque under certain operating conditions. A well-known example would be a small garden tractor which may be driven by a 5 H.P. motor and is belted or geared down in order to develop enough torque to operate small plows, lawn mowers, or other pieces of similar equipment. Often the torque requirements increase two or three times due to excessive loads or hills which require that the torque output exceed the input torque by several times.

To accomplish this torque multiplication without shifting gears, or with as smooth a transmission as possible in a hydrostatic transmission, it is desirable that the flow from the pump be varied infinitely to the hydraulic motor.

It is apparent that a rotary, piston-type, hydraulic pump will operate at higher pressures in its minimum displacement condition and at lower pressures in its maximum displacement condition. Since torque equals displacement times pressure divided by 6.28 and since the torque input is fixed at a maximum, it is necessary to change displacement in order to increase pressure.

With the transmission of the present invention, a gear hydraulic motor supplies torque through its drive shaft which, in turn, is connected to a power output device. As increased torques are demanded from the hydraulic motor, it will require higher pressure from the pump to supply this demand. Accordingly, the pump will reduce its displacement to supply this motor with its increased pressure demand; however, the flow will be reduced proportionately, causing the motor to slow down as the demand for pressure increases. Conversely as the torque output demand diminishes, the pressure demand also diminishes permitting the pump to increase its displacement proportionately.

It is, therefore, a principal object of the present invention to provide a hydrostatic transmission wherein the flow from the pump may be varied infinitely automatically to the hydraulic motor in response to changes in torque demands.

It is a further important object to provide a pump for a hydrostatic transmission which will deliver infinitely variable flow with changes in pressure.

A further object is the provision of a pump control means for such hydrostatic transmission incorporating a biasing means tending to keep the pump in a condition of maximum flow.

Another object is the provision of a control handle for a pump for a hydrostatic transmission incorporating a spring controlling the displacement uniformly regardless of whether the control handle is in reverse or forward position.

A further important object is the provision of a pump control for such a hydrostatic transmission which will open a by-pass around the motor as the variable volume pump approaches minimum displacement thus permitting freewheeling.

Yet another object is the provision of an automatic transmission which when driven by some prime mover at a fixed speed, provides an output torque that can vary beyond the capabilities of the maximum prime mover torque output.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

Figure 2:
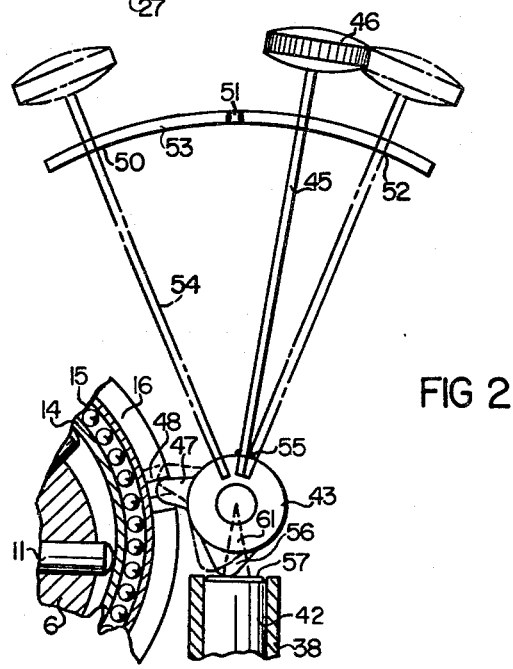

In said annexed drawing:

FIG. 1 is a schematic diagram of a hydrostatic transmission in accordance with the present invention; and FIG. 2 is an enlarged detail view of the pump control mechanism.

Referring now more particularly to FIG. 1, it will be seen that in the illustrated embodiment, a variable delivery piston-type rotary pump 1 is incorporated to supply hydraulic fluid to a gear-type hydraulic motor 2 through main fluid passages 3 and 4. The pump, which may generally be of a conventional type, consists of a rotor 6 which is driven by a drive shaft from some source of power such as the aforementioned engine or prime mover. The rotor thus rotates about a fixed valving pintle 7 having scalloped chambers 9 and 10, as shown, provided with outlets connected to the main passages 3 and 4 respectively. Pistons 11, shown as seven in number, are reciprocable in radially extending bores 12 in the rotor 6 and the outer extensions or projections of the pistons 11 engage and continuously contact the inside of inner race 14 of roller bearing 15 which is retained by housing 16. Such housing 16 is pivoted as indicated at 17 to a fixed member 18 and, as shown, the pivot 17 permits the housing to be moved up and down about the pivot which is horizontally aligned with the center of the valving pintle 7 and, of course, the rotor 6. The housing can then be arranged either concentric with the rotor or oppositely eccentric with the rotor simply by pivoting the housing within the range shown from the full line position to the dotted line position indicated at 20.

In the full line position, which may be termed the forward position, with the rotor rotating in the direction of the arrow 21, fluid in the system will obviously be displaced into the main passage 3 from the pasage 4. In the dotted line, or reverse position of the housing, fluid will be displaced oppositely from the main passage 3 into the passage 4. With the housing and inner race of the bearing thus eccentrically positioned in such full line showing, the pistons 11 will move outwardly in the five to twelve o'clock sector and will move inwardly in the twelve to seven o'clock sector.

In such full line position, as the pistons move radially outwardly, they will be supplied with fluid from the passage 4 which is pressurized at low pressure by means of a piston return pump 23 through an inlet check valve 24 connecting the outlet of pump 23 with passage 25 connected to the main passage 4 at 26. The piston return pump 23 supplies fluid from the reservoir 27 both to the passage 4, through check valve 24, and to the passage 3 through check valve 28 leading to passage 29 connected to main passage 3 at 30.

When the pistons pass the twelve o'clock position and move to the seven o'clock position, they will force fluid out of the valving pintle and into the passage 3 which communicates with the gear hydraulic motor 2 causing it to rotate in the direction shown by the arrows 32 and 33.

The shaft 34 of the gear hydraulic motor 2 may be connected to a suitable work load such as the wheel of a vehicle or the like. As the fluid passes through the motor 2, it returns to the piston pump 1 through the main passage 4. Once the system has been charged, the small pump 23 supplies only enough hydraulic fluid to maintain piston return pressure or make up for any voids in the hydraulic system. This make up pump 23 has a displacement of approximately ⅓ of the main piston pump 1.

It is, of course, apparent that when the inner race 14 and the housing 16 are concentrically positioned with respect to the pintle 7 and rotor 6, communication between the passages 3 and 4 will be effectively blocked. In such concentric position, there will be no displacement of the pistons due to the rotation of the rotor within the housing.

It has been found from laboratory tests that as the variable volume pump 1 reaches or approaches this position of minimum displacement, the hydraulic motor 2 tends to lock out. It is also apparent that in this concentric position, the motor will not freewheel since there is a blocked discharge when the pump is at zero displacement.

In order to preclude this lock out and, of course, to permit freewheeling of the motor, there is provided a freewheeling valve indicated generally at 35 selectively providing communication between passages 36 and 37 connected to main passages 3 and 4, respectively. Such freewheeling valve 35 may, for example, be the poppet-type valve shown having a plunger or the like 42 mounted in a housing 38 with a spring 39 in the bottom of the housing holding the valve member enlargement 40 against the seat 41 normally closing fluid communication between passages 36 and 42. Thus when the valve member 37 is depressed against the pressure of spring 39, the valve member enlargement 40 will move away from the seat 41 permitting fluid flow between the pasages 36 and 37 and accordingly between the main passages 3 and 4.

With the present invention, the freewheeling valve is operated by the same control mechanism as is the pump 1. Such control comprises a hub cam 43 pivoted on mounting shaft 44 for oscillation about the axis thereof by means of a control handle 45 having a control knob 46 on the distal end thereof. The hub cam 43 has two operating cam projections thereon, one projection 47, being associated with the pump housing and operating in a slot 48 therein, is effective to cause the housing to move up and down about the pivot 17 with corresponding back and forth movements of the handle 45.

The handle may be positioned in slots 50, 51 or 52 in an operating quadrant 53 so as to place the housing 16 concentric or oppositely eccentric in relation to the rotor 6. In the illustrated embodiment, there are shown three such notches and the center notch 51 may be the concentric or neutral position, with the notch 52 being the forward position and the notch 50 being the reverse position; the dotted line position 54 of the handle in the slot 50 corresponding to the dotted line position 20 of the housing 16. The handle 45 may be rigidly secured to the hub cam 43 by the welding indicated at 55. Accordingly, the operator need only grasp the knob 46 properly to position the handle in the selected working position and properly to locate the pump housing with respect to the rotor.

The second cam projection 56 of the hub cam 43 is arranged to engage the top 57 of the valve member 42 to depress the same as the handle approaches the neutral or vertical position.

It has been found that the aforementioned motor lockout occurs when the pump output falls below 15% of its maximum flow and accordingly there is provided a clearance between the cam projection 56 and the top 57 of the valve member 42 so that the valve is only actuated when the cam is within 10° of neutral or vertical position. Thus, from this 10° point on either side, until the control handle is in its neutral or vertical position, the valve 42 will be opened permitting the flow from line 3 to line 4 or vice versa. In this manner, the motor 2 can then operate as a freewheeling unit as the pump housing 16 approaches its concentric or neutral position.

As the result of laboratory tests, it has been found that increased pressure to the hydraulic pump causes the housing 16 to move towards the concentric position, and this, of course, tends to decrease flow. Accordingly, the application of a spring load which will tend to keep the housing 16 in its selected position of maximum eccentricity is all that is necessary in order for the pump to deliver automatically an infinitely variable flow with changes in pressure. In the illustrated embodiment, this has been accomplished by incorporating such spring loading means in the handle itself. The handle 45 is made from spring steel so that it will function as the spring means for controlling the displacement uniformly regardless of whether the control handle is in reverse or forward position. As shown in FIG. 1, as the pressure increases, the handle 45, being retained in slot 52, will flex as shown by the dotted line position 60. As aforesaid, this increased pressure may result from an increased torque being demanded from the hydraulic motor which will require higher pressures from the pump to supply this demand. As the pump housing 16 moves toward its concentric position, against the spring bias pressure of the handle 45, the flow will be reduced proportionately causing the motor 2 to slow down as the demand for pressure increases. Conversely, when the torque output demand diminishes, the pressure demand also diminishes and the spring handle 45 will again bias the housing to its position of maximum selected eccentricity permitting the pump to increase its displacement proportionately. It is apparent that the same spring means functions in the same manner in both the forward and reverse positions and moreover the pressure or spring bias provided by the handle increases as the pump housing moves from its position of maximum selected eccentricity.

As seen in FIG. 2, the control handle in its full line position is approximately 10° from the center or neutral slot 51 and in this position, the cam projection 56 will engage the top 57 of the valve member 42. Through the angular range shown at 61, the projection 56 will be in engagement with the valve member 42 opening communication between the main passages 3 and 4.

Check valves 63 and 64 communicating with main passages 3 and 4 through branch passages 65 and 66, respectively, communicate with a main relief valve 67, adjusted to slightly above maximum working pressure, which prevents damage to the system or overloading should excessive loads be applied to the hydraulic motor, or should the control lever 45 be used as a hydraulic brake. In this manner, no damage can occur to the system by operating in the full forward position and then throwing the operating lever into the full reverse position or vice versa. A passage 68 communicates the main relief valve 67 with the reservoir 27. Also, a low pressure relief valve 69 may be provided in the outlet passage of the small pump 23 returning the flow thereof to the reservoir above a certain preselected pressure.

It can now be seen that there is provided a unique and simplified control mechanism for a hydrostatic transmission wherein the single control mechanism combines not only the spring means biasing the pump housing to its maximum position of selected eccentricity, but also the forward and reverse control as well as the neutral or freewheeling valve actuator.

Other modes of applying the principle of the invention may be employed, change being made as regards the details described, provided the features stated in any of the following claims or the equivalent of such be employed.

I, therefore, particularly point out and distinctly claim as my invention:

1. A control mechanism for a hydrostatic transmission of the type having a reversible variable capacity pump and a motor operatively connected thereto, said control mechanism comprising a spring handle means, a quadrant, notches in said quadrant adapted to engage and hold said spring handle means in a selected position of adjustment thereby to vary the direction of flow and capacity of said pump, said spring handle means being operative resiliently to bias said control mechanism to its positions thus to deliver variable flow with changes in pressure.

2. The control mechanism as set forth in claim 1 including a freewheeling valve operatively associated with said control mechanism, means responsive to the movement of said control handle to a position providing minimum flow from said pump operatively to open said freewheeling valve by-passing said pump.

3. A hydrostatic transmission comprising a variable capacity pump and a motor driven thereby, said pump comprising a fixed axis valving pintle and a rotor rotating thereabout, radially extending bores in said rotor, pistons reciprocably mounted in said bores and projecting radially beyond said rotor to contact the inner race of a circular bearing surrounding said rotor, a housing retaining said bearing and having a pivot point whereby said housing and thus said bearing may be moved oppositely eccentrically with respect to the axis of said valving pintle thereby to vary the displacement of said pump; control means operative thus eccentrically to shift said housing with respect to said valving pintle and rotor comprising, a hub cam, means mounting said hub cam for rotation on a fixed axis, said hub cam having a projection engaging said housing adapted to move said housing about said pivot as said hub cam is rotated about said fixed axis, handle means connected to said hub cam operative thus to rotate said hub cam, said handle means comprising a leaf spring, and means to retain said leaf spring handle in selected positions providing maximum flow from said pump, said leaf spring handle resiliently maintaining said hub cam in the thus selected position; and a further projection on said hub cam adapted to engage a valve to by-pass said pump as said hub cam moves said housing to a position wherein said housing and rotor approach concentricity.

4. In a control mechanism having a hydrostatic transmission of the type having a variable capacity pump and a motor connected thereto, a pivotally mounted control mechanism operatively connected to said pump and adapted to be pivoted to a position obtaining a predetermined flow output for said pump, and means operative resiliently to maintain said pivotally mounted control mechanism and thus said pump in such predetermined selected position to vary infinitely automatically the flow from said variable capacity pump to said motor in response to changes in torque demands.

5. In a control mechanism for a hydrostatic transmission of the type having a variable capacity pump and a motor connected thereto, an operating handle operatively connected to said pump and adapted to be shifted to a position obtaining a maximum flow output for said pump, and means operative resiliently to maintain said pump in its thus selected position to deliver variable flow from said pump to said motor with changes in pressure, said handle being made of a spring material and being adapted to engage notches in an operating quadrant.

6. In a control mechanism for a hydrostatic transmission of the type having a variable capacity pump and a gear type motor connected thereto, an operating handle operatively connected to said pump and adapted to be shifted to a position obtaining a maximum flow output for said pump, means operative resiliently to maintain said pump in its thus selected position to deliver variable flow from said pump to said motor with changes in pressure, and means operative to by-pass said pump as said control handle is moved toward a position obtaining minimum displacement from said pump to preclude motor lockout and permit freewheeling of said motor.

7. A hydrostatic transmission of the type having a variable capacity pump operatively connected to a motor, a pivotally mounted control means operatively connected to said pump, said pivotally mounted control means being adapted to be pivoted to any one of at least three positions to control the direction and capacity of flow through said pump, the first of said positions being the position of a predetermined flow output from said pump in one direction, the second position being the position of a predetermined flow output from said pump in the opposite direction, and the third position being the neutral position or the position of minimum flow output from said pump, and spring means operative to maintain resiliently said control means in the selected positions so as to cause automatically a variation in the flow from said pump to said motor in response to changes in torque demands from said motor.

8. The combination set forth in claim 7 including means responsive to the approach of said control means to said neutral position operative to by-pass said pump.

9. The combination as set forth in claim 8 wherein said pump comprises a rotary piston-type pump with said pistons mounted for reciprocation in a rotor, and a housing pivotally movable with respect to said rotor, said control mechanism comprising means pivotally to move said housing with respect to said rotor.

10. The combination set forth in claim 9 including a spring steel handle for said control means operative yieldably to maintain said housing in a position of selected eccentricity with respect to said rotor.

11. The combination set forth in claim 10 wherein said handle is connected to a hub cam, said hub cam having one projection engaging said housing thus to move the same, and another projection engaging a valve member to provide such by-pass for said pump as said control mechanism approaches its neutral position.

References Cited in the file of this patent

UNITED STATES PATENTS

| | | |
|---|---|---|
| 2,185,157 | West | Nov. 1, 1938 |
| 2,316,926 | Willett | Apr. 20, 1943 |
| 2,588,866 | Moon | Mar. 11, 1952 |
| 3,003,309 | Bowers et al. | Oct. 10, 1961 |
| 3,008,423 | Miller | Nov. 14, 1961 |
| 3,099,136 | Carlson | July 30, 1963 |

FOREIGN PATENTS

| | | |
|---|---|---|
| 679,822 | Great Britain | Sept. 24, 1952 |